US010679493B2

(12) United States Patent
Kumhyr et al.

(10) Patent No.: US 10,679,493 B2
(45) Date of Patent: Jun. 9, 2020

(54) COGNITIVE-BASED INCIDENT RESPONSE

(71) Applicant: INTERNATIONAL BUSINESS MACHINES CORPORATION, Armonk, NY (US)

(72) Inventors: David B. Kumhyr, Austin, TX (US); John F. Behnken, Hurley, TX (US); Louie A. Dickens, Tucson, AZ (US); Rodolfo Lopez, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/707,712

(22) Filed: Sep. 18, 2017

(65) Prior Publication Data
US 2019/0088114 A1 Mar. 21, 2019

(51) Int. Cl.
G08G 1/01 (2006.01)
G08G 1/00 (2006.01)
(Continued)

(52) U.S. Cl.
CPC .......... *G08G 1/0104* (2013.01); *G06F 16/95* (2019.01); *G08G 1/048* (2013.01); *G08G 1/205* (2013.01);
(Continued)

(58) Field of Classification Search
USPC ........................................................ 701/117
See application file for complete search history.

(56) References Cited

U.S. PATENT DOCUMENTS 5,664,112 A * 9/1997 Sturgeon .............. G06Q 10/087
700/95
5,777,565 A * 7/1998 Hayashi ............... G07B 15/063
340/928

(Continued)

FOREIGN PATENT DOCUMENTS

WO 2016193782 8/2016

OTHER PUBLICATIONS

Arta Dilo et al., A data model for operational and situational information in emergency response, https://link.springer.com/article/10.1007/s12518-011-0060-2, Last visited Mar. 4, 2017.

(Continued)

*Primary Examiner* — Jean Paul Cass
(74) *Attorney, Agent, or Firm* — Kunzler Bean & Adamson, PC; Bruce R. Needham

(57) ABSTRACT

An apparatus, method, program product, and system are disclosed for cognitive-based incident response. A sensor module captures baseline environment data related to a traffic incident using one or more sensors at a location of the traffic incident. A recommendation module generates and makes available, in real-time, one or more recommendations for responding to the traffic incident using cognitive computing processes based on the baseline environment data, the one or more recommendations comprising precautionary information for managing one or more emergency situations at the traffic incident. An update module continuously captures new environment data for the traffic incident using the one or more sensors, supplements the baseline environment data with the new environment data, and generates and makes available, in real-time, one or more updated recommendations based on the supplemented environment data using the supplemented environment data and the cognitive computing processes.

18 Claims, 6 Drawing Sheets

(51) Int. Cl.
*G08G 1/048* (2006.01)
*H04W 4/021* (2018.01)
*G06F 16/95* (2019.01)
*H04W 4/90* (2018.01)
*H04W 4/40* (2018.01)

(52) U.S. Cl.
CPC ............ *H04W 4/021* (2013.01); *H04W 4/40* (2018.02); *H04W 4/90* (2018.02)

(56) References Cited

U.S. PATENT DOCUMENTS

| | | | |
|---|---|---|---|
| 7,005,997 B1* | 2/2006 | Wiewiura | F16P 3/147 |
| | | | 340/3.1 |
| 7,457,834 B2 | 11/2008 | Jung et al. | |
| 8,468,244 B2* | 6/2013 | Redlich | G06Q 10/06 |
| | | | 709/225 |
| 8,849,494 B1* | 9/2014 | Herbach | B60W 30/00 |
| | | | 701/24 |
| 8,964,298 B2* | 2/2015 | Haddick | G06F 3/013 |
| | | | 359/630 |
| 8,996,224 B1* | 3/2015 | Herbach | G05D 1/0011 |
| | | | 180/116 |
| 9,008,890 B1* | 4/2015 | Herbach | B60W 30/00 |
| | | | 701/26 |
| 9,020,697 B2* | 4/2015 | Ricci | H04W 4/21 |
| | | | 701/36 |
| 9,147,298 B2* | 9/2015 | Ricci | B60Q 1/00 |
| 9,224,096 B2* | 12/2015 | Oppenheimer | G06F 21/50 |
| 9,643,722 B1* | 5/2017 | Myslinski | B64C 39/024 |
| 9,711,050 B2* | 7/2017 | Ansari | G08G 1/167 |
| 9,728,087 B2 | 8/2017 | Davis | |
| 9,760,776 B1* | 9/2017 | Wilbert | G06F 16/532 |
| 9,805,601 B1 | 10/2017 | Fields et al. | |
| 9,836,056 B2* | 12/2017 | Ansari | G05D 1/0212 |
| 9,870,437 B2* | 1/2018 | Pope | G06F 17/5004 |
| 9,916,538 B2* | 3/2018 | Zadeh | G06N 7/005 |
| 10,354,505 B2* | 7/2019 | Oppenheimer | G08B 13/2428 |
| 2001/0056359 A1* | 12/2001 | Abreu | G06K 7/10861 |
| | | | 705/3 |
| 2004/0248071 A1* | 12/2004 | Bedziouk | A63B 24/00 |
| | | | 434/247 |
| 2009/0248437 A1* | 10/2009 | Gucciardi | G16H 10/65 |
| | | | 705/2 |
| 2010/0250111 A1 | 9/2010 | Gutierrez et al. | |
| 2012/0083960 A1* | 4/2012 | Zhu | G05D 1/0214 |
| | | | 701/23 |
| 2013/0104186 A1* | 4/2013 | Dietz | H04L 63/10 |
| | | | 726/1 |
| 2013/0173697 A1 | 7/2013 | Wang | |
| 2013/0222133 A1 | 8/2013 | Schultz et al. | |
| 2014/0089243 A1* | 3/2014 | Oppenheimer | G06F 21/50 |
| | | | 706/46 |
| 2015/0009327 A1* | 1/2015 | Love | H04W 4/029 |
| | | | 348/148 |
| 2015/0235484 A1* | 8/2015 | Kraeling | G07C 5/0866 |
| | | | 701/1 |
| 2015/0348112 A1* | 12/2015 | Ramanujam | G06Q 30/0266 |
| | | | 705/14.63 |
| 2015/0348335 A1* | 12/2015 | Ramanujam | G07C 5/006 |
| | | | 701/23 |
| 2016/0173697 A1 | 6/2016 | Brown et al. | |
| 2016/0292872 A1* | 10/2016 | Hammond | G01S 17/66 |
| 2017/0161614 A1 | 6/2017 | Mehta et al. | |
| 2017/0263128 A1* | 9/2017 | Chandran | G06T 7/50 |
| 2018/0201257 A1* | 7/2018 | Dudar | B60J 1/2094 |
| 2018/0204111 A1* | 7/2018 | Zadeh | G06N 3/0436 |

OTHER PUBLICATIONS

Safe Software, FME enabled us to reduce our data preparation process from two weeks to two hours with one mouse click, https://www.safe.com/solutions/for-industries/emergency-services-and-policing/, Last visited Mar. 4, 2017.

\* cited by examiner

COGNITIVE-BASED INCIDENT RESPONSE

FIELD

The subject matter disclosed herein relates to cognitive computing and more particularly relates to assessing a traffic incident scene using cognitive-computing generated recommendations and alerts.

BACKGROUND

Traffic incidents such as traffic accidents may involve many components such as people, containers, liquids, fire, hazardous materials, and/or the like, which may pose a threat to responders or may otherwise affect how responders react to the traffic incident. Responders do not typically know beforehand the identities of people involved in the traffic incident, whether there are any hazardous chemicals at the traffic incident, and/or the like. Further, responders may not be able to predict changing conditions at the traffic incident, which may pose a threat to the safety of the responders and other individuals at the traffic incident.

SUMMARY

An apparatus, method, and system for cognitive-based incident response is disclosed. One embodiment of an apparatus includes a sensor module that captures baseline environment data related to a traffic incident using one or more sensors at a location of the traffic incident. The apparatus includes a recommendation module that generates and makes available, in real-time, one or more recommendations for responding to the traffic incident using cognitive computing processes based on the baseline environment data, the one or more recommendations comprising precautionary information for managing one or more emergency situations at the traffic incident. The apparatus includes an update module that continuously captures new environment data for the traffic incident using the one or more sensors, supplements the baseline environment data with the new environment data, and generates and makes available, in real-time, one or more updated recommendations based on the supplemented environment data. The supplemented environment data and the one or more recommendations are provided to the cognitive computing processes to generate the one or more updated recommendations.

One embodiment of a system for cognitive-based incident response includes one or more local devices at a traffic incident and one or more sensors communicatively coupled to the one or more local devices. The system includes a remote server communicatively coupled to the one or more local devices over one or more computer networks, the remote server executing one or more cognitive computing processes. The system includes a sensor module that captures baseline environment data related to a traffic incident using one or more sensors at a location of the traffic incident. The system includes a recommendation module that generates and makes available, in real-time, one or more recommendations for responding to the traffic incident using cognitive computing processes based on the baseline environment data, the one or more recommendations comprising precautionary information for managing one or more emergency situations at the traffic incident. The system includes an update module that continuously captures new environment data for the traffic incident using the one or more sensors, supplements the baseline environment data with the new environment data, and generates and makes available, in real-time, one or more updated recommendations based on the supplemented environment data. The supplemented environment data and the one or more recommendations are provided to the cognitive computing processes to generate the one or more updated recommendations.

One embodiment of a method for cognitive-based incident response includes capturing baseline environment data related to a traffic incident using one or more sensors at a location of the traffic incident. The method includes generating and making available, in real-time, one or more recommendations for responding to the traffic incident using cognitive computing processes based on the baseline environment data. The one or more recommendations include precautionary information for managing one or more emergency situations at the traffic incident. The method includes continuously capturing new environment data for the traffic incident using the one or more sensors. The method includes supplementing the baseline environment data with the new environment data. The method includes generating and making available, in real-time, one or more updated recommendations based on the supplemented environment data. The supplemented environment data and the one or more recommendations are provided to the cognitive computing processes to generate the one or more updated recommendations.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and shall not be considered to be limiting of scope, the embodiments will be described and explained with additional specificity and detail through the use of the accompanying drawings, in which.

DETAILED DESCRIPTION OF THE INVENTION

Figure 1:
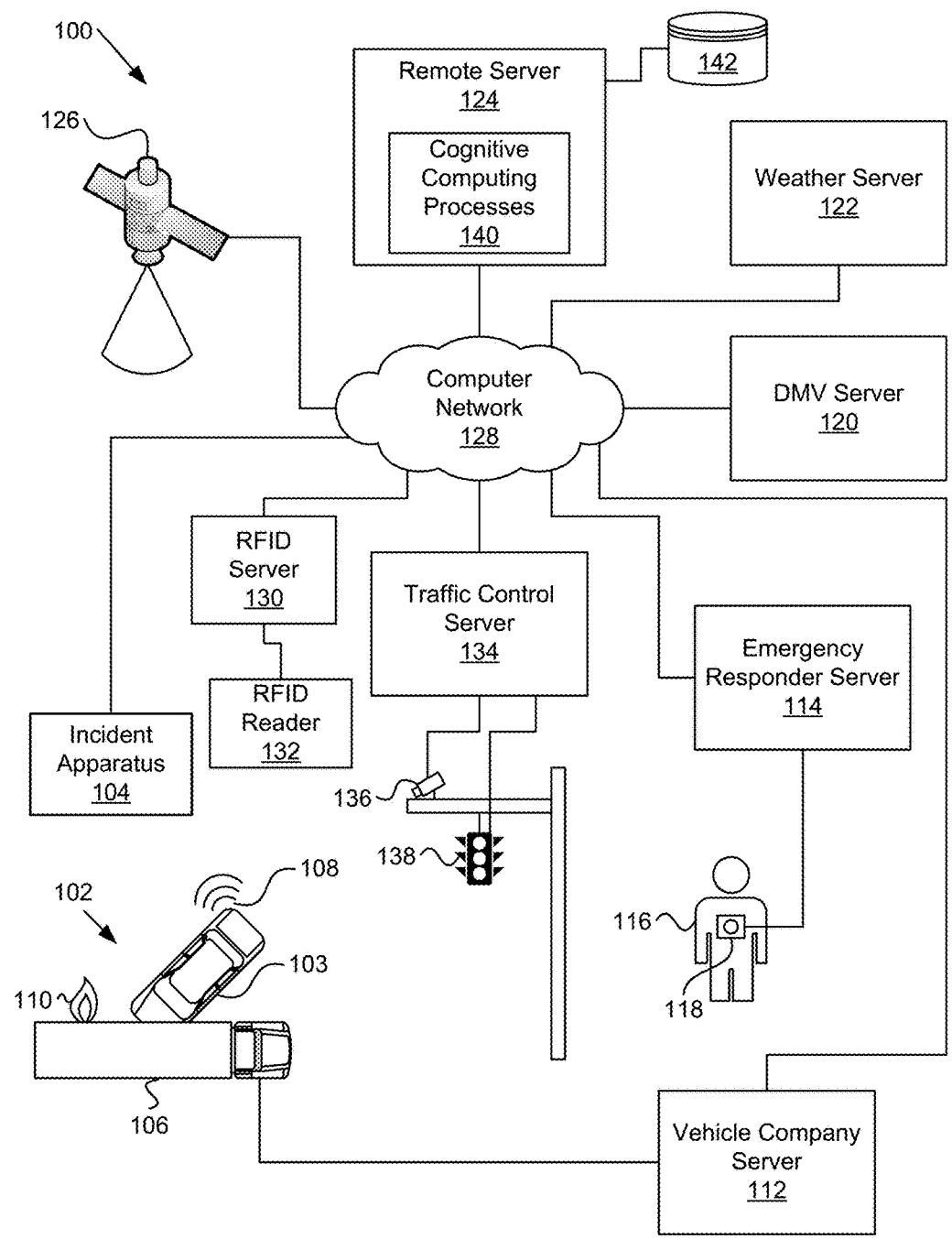
FIG. 1 is a schematic block diagram illustrating one embodiment of a system for cognitive-based incident response.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software as executable code for execution by various types of processors. An identified module of executable code may, for instance, comprise one or more physical or logical blocks of computer instructions which may, for instance, be organized as an object, procedure, or function. Nevertheless, the executable code of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

An apparatus, method, and system for cognitive-based incident response is disclosed. One embodiment of an apparatus includes a sensor module that captures baseline environment data related to a traffic incident using one or more sensors at a location of the traffic incident. The apparatus includes a recommendation module that generates and makes available, in real-time, one or more recommendations for responding to the traffic incident using cognitive computing processes based on the baseline environment data, the one or more recommendations comprising precautionary information for managing one or more emergency situations at the traffic incident. The apparatus includes an update module that continuously captures new environment data for the traffic incident using the one or more sensors, supplements the baseline environment data with the new environment data, and generates and makes available, in real-time, one or more updated recommendations based on the supplemented environment data. The supplemented environment data and the one or more recommendations are provided to the cognitive computing processes to generate the one or more updated recommendations.

In one embodiment, the cognitive computing processes are located on a remote server accessible to one or more computer networks comprising information related to the traffic incident. The environment data may be transmitted from the traffic incident to the remote server over the one or more computer networks.

In further embodiments, the apparatus includes an alert module that immediately generates and sends an alert to responders at the traffic incident in response to the cognitive computing processes determining a high-risk situation at the traffic incident based on the environment data. In certain embodiments, the cognitive computing processes further access and analyze traffic incident data from previous traffic incidents for traffic incident data that is similar to one or more conditions of the traffic incident to generate the one or more recommendations for responding to the traffic incident.

In one embodiment, the apparatus includes an individual module that determines, on an ongoing basis during the traffic incident, image data from the environment data captured by the one or more sensors, which may include a camera. The individual module may provide the image data to the cognitive computing processes to identify one or more persons present at the traffic incident and to determine background information for the one or more identified persons, the cognitive computing processes accessing background check and medical record data to determine the background information for each of the one or more persons. The individual module, in another embodiment, updates the one or more recommendations, in real-time, in response to the background information indicating that one or more individuals at the traffic incident poses a threat and/or has a documented medical condition.

In one embodiment, the apparatus includes a temperature module that determines, on an ongoing basis during the traffic incident, thermal imaging data from the environment data captured by the one or more sensors, which may include a thermal camera. The temperature module may provide the thermal imaging data to the cognitive computing processes to identify one or more areas of the traffic incident where the temperature indicates one or more of an area that is a fire risk and an area where the temperature is abnormal. The temperature module, in further embodiments, updates the one or more recommendations, in real-time, based on the identified areas.

In one embodiment, the apparatus includes a weather module that determines, on an ongoing basis during the traffic incident, weather information from the environment data captured by the one or more sensors, which may include a weather station. The weather module may provide the weather information to the cognitive computing processes to determine one or more conditions at the traffic incident that may change responsive to the weather information. The cognitive computing processes may access weather data from one or more external weather sources. In some embodiments, the weather module updates the one or more recommendations, in real-time, based on the one or more conditions that may change.

In one embodiment, the apparatus includes an RFID module that determines, on an ongoing basis during the traffic incident, radio-frequency identification ("RFID") information from the environment data captured by the one or more sensors, which may include an RFID tag reader. In some embodiments, the RFID module provides the RFID information to the cognitive computing processes to determine the contents of one or more containers at the traffic incident. The cognitive computing processes may reference one or more of electronic manifests and payload data using the RFID information to determine the contents of the one or more containers. In further embodiments, the RFID module updates the one or more recommendations, in real-time, based on the determined container contents.

In one embodiment, the apparatus includes an OCR module that determines, on an ongoing basis during the traffic incident, one or more images of the environment data captured by the one or more sensors that include textual information. The one or more sensors may include a camera. In certain embodiments, the OCR module provides the one or more images comprising textual information to the cognitive computing processes to recognize and determine identifying information for parties involved in the traffic incident, companies associated with parties involved in the traffic incident, and/or shipping containers involved in the traffic incident. In further embodiments, the OCR module updates the one or more recommendations, in real-time, based on the identifying information.

In one embodiment, the apparatus includes a medical module that determines, on an ongoing basis during the traffic incident, medical transponder information from the environment data captured by the one or more sensors such as a medical transponder frequency scanner. In various embodiments, the medical module provides the medical transponder information to the cognitive computing processes to determine whether conditions at the traffic incident may be detrimental to persons that have medical conditions associated with the medical transponders. In another embodiment, the medical module updates the one or more recommendations, in real-time, based on the medical transponder information.

In one embodiment, the cognitive computing processes scrape information from one or more external data sources for data related to the traffic incident based on the environment data. The scraped information may be ranked by relevance to the traffic incident such that highest-ranked information is used to generate the one or more recommendations.

In one embodiment, the one or more recommendations further include recommendations for equipment that may be needed to manage one or more situations at the traffic incident. The equipment may include one or more of medical equipment, fire extinguishing equipment, and chemical handling equipment.

In certain embodiments, the one or more sensors are associated with one or more of a vehicle involved in the traffic incident, a vehicle proximate to the traffic incident, a traffic signal control system, a responder's device, and a driver's device.

One embodiment of a system for cognitive-based incident response includes one or more local devices at a traffic incident and one or more sensors communicatively coupled to the one or more local devices. The system includes a remote server communicatively coupled to the one or more local devices over one or more computer networks, the remote server executing one or more cognitive computing processes. The system includes a sensor module that captures baseline environment data related to a traffic incident using one or more sensors at a location of the traffic incident. The system includes a recommendation module that generates and makes available, in real-time, one or more recommendations for responding to the traffic incident using cognitive computing processes based on the baseline environment data, the one or more recommendations comprising precautionary information for managing one or more emergency situations at the traffic incident. The system includes an update module that continuously captures new environment data for the traffic incident using the one or more sensors, supplements the baseline environment data with the new environment data, and generates and makes available, in real-time, one or more updated recommendations based on the supplemented environment data. The supplemented environment data and the one or more recommendations are provided to the cognitive computing processes to generate the one or more updated recommendations.

In one embodiment, the captured environment data is transmitted from the one or more local devices to the remote server over the one or more computer networks to be processed using the cognitive computing processes. In further embodiments, the system includes an alert module that immediately generates and sends an alert to responders at the traffic incident in response to the cognitive computing processes determining a high-risk situation at the traffic incident based on the environment data.

In one embodiment, the cognitive computing processes scrape information from one or more external data sources for data related to the traffic incident based on the environment data. The scraped information may be ranked by relevance to the traffic incident such that highest-ranked information is used to generate the one or more recommendations. In certain embodiments, the one or more sensors are associated with one or more of a vehicle involved in the traffic incident, a vehicle proximate to the traffic incident, a traffic signal control system, a responder's device, and a driver's device.

One embodiment of a method for cognitive-based incident response includes capturing baseline environment data related to a traffic incident using one or more sensors at a location of the traffic incident. The method includes generating and making available, in real-time, one or more recommendations for responding to the traffic incident using cognitive computing processes based on the baseline environment data. The one or more recommendations include precautionary information for managing one or more emergency situations at the traffic incident. The method includes continuously capturing new environment data for the traffic incident using the one or more sensors. The method includes supplementing the baseline environment data with the new environment data. The method includes generating and making available, in real-time, one or more updated recommendations based on the supplemented environment data. The supplemented environment data and the one or more recommendations are provided to the cognitive computing processes to generate the one or more updated recommendations.

In one embodiment, the cognitive computing processes are located on a remote server accessible to one or more computer networks that include information related to the traffic incident, the environment data transmitted from the traffic incident to the remote server over the one or more computer networks.

FIG. 1 depicts one embodiment of a system 100 for cognitive-based incident response. In one embodiment, the system 100 illustrates a traffic incident 102. The traffic incident 102 may involve one or more passenger vehicles 103, semi-trucks 106, motorcycles, trucks, sport utility vehicles, cars, trains, bicycles, and/or other forms of transportation. The traffic incident 102 may include a collision that includes a single vehicle (e.g., a collision with a tree, pole, pedestrian, or the like), or a collision that includes multiple different vehicles.

In certain embodiments, the vehicles may include various sensors 108 that capture vehicle-specific data. For instance, the vehicles may include speedometers, accelerometers, location sensors (e.g., global positioning system ("GPS") sensors), cameras, impact sensors for airbags, video cameras, microphones, diagnostic sensors (e.g., an on-board diagnostic system), and/or the like, that capture data related to the motion and operation of the vehicles. In certain embodiments, the vehicles include various sensors for sampling environment data around the vehicle, within a vicinity of the vehicle, and/or the like. For example, the vehicles may include motion sensors, proximity sensors, light sensors, sound sensors, cameras, video cameras, temperature sensors, and/or the like. In some embodiments, the vehicles, the vehicle's sensors 108, and/or one or more devices within the vehicle may be communicatively coupled to one or more data or computer networks 128 such as Wi-Fi networks, cellular networks, Bluetooth® networks, and/or the like.

In one embodiment, other sensors may be present at the traffic incident 102. For example, if the traffic incident 102 is near a traffic signal 138, the traffic signal system may include cameras 136 that capture images and video of the area around the traffic signal. In another example, responders 116 to the traffic incident 102 such as law enforcement officers, emergency responders, and/or the like may have body cameras 118, or other sensors (e.g., oxygen sensors, smoke sensors, or the like) on their person. Other sensors may include radio frequency tag readers for reading and interpreting RFID tags, wireless signal sensors for capturing wireless signals emitted from wireless devices such as medical transponders.

The incident apparatus 104, in one embodiment, is configured to capture a baseline sent of environment data related to the traffic incident 102 using one or more of the various sensors capturing data at the traffic incident 102. In a further embodiment, the incident apparatus 104 generates and makes available, in real-time, one or more recommendations for responding to the traffic incident 102 using cognitive computing processes 140 based on the baseline environment data. The one or more recommendations may include precautionary information for managing one or more emergency situations at the traffic incident 102. The incident apparatus 104, in further embodiments, continuously captures new environment data for the traffic incident 102 using the various sensors and supplements or enhances the baseline environment data with the new environment data. Based on the supplemented environment data, the incident apparatus 104 generates and makes available, in real-time, one or more updated recommendations for responding to the traffic incident 102 using the cognitive computing processes 140.

In certain embodiments, the incident apparatus 104 improves traffic incident response procedures and strategies for individuals involved in the traffic incident 102 such as drivers, passengers, law enforcement officers, emergency responders, and/or other first responders, by providing real-time, dynamic, and up-to-date recommendations and/or alerts for responding to the traffic incident 102. Sensors continually capture data throughout the entire traffic incident 102, e.g., while the traffic incident 102 is being observed, researched, processed, and cleaned-up, to monitor for any changing conditions or other circumstances present at the traffic incident 102 that may cause harm to individuals at the traffic incident 102 (e.g., such as a fire 110), pose a threat to individuals at the traffic incident 102, and/or the like, and dynamically update the recommendations and/or alerts in real-time while the traffic incident 102 is processed. Without using the incident apparatus 104 at the traffic incident 102, individuals may not be aware of, or may not have time to react to certain conditions at the traffic incident 102 that may be harmful or threatening to the safety of the individuals.

In various embodiments, the incident apparatus 104 may be embodied as a hardware appliance that can be installed or deployed on a device such as a computer, phone, or tablet device, or elsewhere on the computer network 128. In certain embodiments, the incident apparatus 104 may include a hardware device such as a secure hardware dongle or other hardware appliance device (e.g., a set-top box, a network appliance, or the like) that attaches to a device such as a laptop computer, a server, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the incident apparatus 104 may include a power interface, a wired and/or wireless network interface, a graphical interface that attaches to a display, and/or a semiconductor integrated circuit device as described below, configured to perform the functions described herein with regard to the incident apparatus 104.

The incident apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the incident apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the incident apparatus 104.

The semiconductor integrated circuit device or other hardware appliance of the incident apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the incident apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The semiconductor integrated circuit device or other hardware appliance of the incident apparatus 104, in some embodiments, is embodied as a portable device that responders 116 can take to a scene of a traffic incident 102 and collect, sense, sample, capture, and process data from the traffic incident 102 and provide real-time and dynamic recommendations and alerts to responders 116 and other individuals at the traffic incident 102 or individuals on the way to the traffic incident 102. In such an embodiment, the portable device may be dedicated, hard-wired, specially programmed, and/or the like to collect sensor data, on a continual basis, and generate recommendations based on the collected sensor data using cognitive computing processes 140, either locally on the device or in the cloud.

In certain embodiments, the semiconductor integrated circuit device or other hardware appliance of the incident apparatus 104 is communicatively coupled to one or more sensors such as weather sensors, RFID readers, wireless signal sensors, cameras, microphones, and/or the like. For instance, each sensor may be directly connected to a different port on the hardware embodiment of the incident apparatus 104, may be communicatively connected to a different port on the hardware embodiment of the incident apparatus 104, e.g., a network port, and/or the like. In such an embodiment, the sensors may be mounted to a device in such a way that allows the sensors to move and continually scan the scene of the traffic incident 102 for data related to the traffic incident 102.

For example, in one embodiment, the incident apparatus 104 may be communicatively or operably coupled to an RFID reader 132 for scanning and interpreting RFID tags that are present at the traffic incident 102. The RFID reader 132 may be connected to an RFID server 130 that stores and processes data that the RFID reader 132 captures. The incident apparatus 104 may be communicatively coupled to the RFID server 130 over the computer network 128 to request, access, store, and/or the like RFID data associated with the traffic incident 102.

In another embodiment, the incident apparatus 104 is communicatively coupled to a traffic control server 134 to access data captured by traffic cameras 136 and/or to access data associated with traffic signals 138 (e.g., the state/color of the traffic signal at a certain time). The traffic control server 134 may be a server maintained by a department of transportation or other entity (e.g., the national highway traffic safety administration) that maintains and manages traffic signals 138, traffic data, and/or other traffic control mechanisms.

In further embodiments, the incident apparatus 104 is communicatively coupled to an emergency responder server 114 to access data captured by one or more sensors associated with an emergency responder 116 such as body cameras 118, temperature sensors (e.g., worn by firefighters), chemical sensors, and/or the like. In some embodiments, the emergency responder server 114 stores data manually entered by emergency responders 116 such as observations, witness statements, and/or the like. The emergency responder server 114 may be maintained by an emergency medical technician ("EMT") service, a law enforcement service, a firefighter service, and/or the like.

In various embodiments, the incident apparatus 104 is communicatively coupled to a vehicle company server 112 to access information associated with vehicles that are involved in the traffic incident 102. For instance, if a semi-truck that is carrying goods is involved in the traffic incident 102, the incident apparatus 104 may query the vehicle company server 112 for information related to what the goods are that the semi is carrying such as the chemical composition of the goods, the flammability of the goods, the weight of the goods, and/or the like. Other data that the incident apparatus 104 may access from the vehicle company server 112 includes electronic manifests, driver information, source and destination information, and/or the like.

In one embodiment, the incident apparatus 104 is communicatively coupled to a division of motor vehicle ("DMV") server 120 to access information associated with drivers and/or vehicles that are involved in the traffic incident 102. The information may include identification information, background information (e.g., arrest records, previous citations, and/or the like), and/or the like. The DMV server 120 may be maintained by a government agency and/or other entity that manages and maintains records for drivers and vehicles.

In certain embodiments, the incident apparatus 104 is communicatively coupled to a weather server 122 to access current weather information/data and/or future weather forecasts. The weather information may include temperature information, precipitation information, humidity information, wind information, and/or the like. The weather server 122 may be maintained by a weather agency, a weather station, and/or the like.

The incident apparatus 104, in various embodiments, is communicatively coupled to a location services device such as a satellite 126, a GPS service, and/or the like. The location information that the location services device provides may include an address, a point of interest, a GPS coordinate, and/or the like of the traffic incident 102, of responders on the way to the traffic incident 102, and/or the like.

The incident apparatus 104, in one embodiment, is communicatively coupled to a remote server 124 that may be used to perform the various cognitive computing 140, machine learning, and/or artificial intelligence processes that are applied to the various data that is received from the different data sources in the distributed network. In some embodiments, as used herein, cognitive computing refers to machine learning, reasoning, natural language processing, speech recognition and vision (object recognition), human-computer interaction, dialog and narrative generation, and/or the like processes that are intended to mimic the functioning of the human brain and helps improve upon human decision making. IBM's Watson® is one example of a cognitive computing system.

Thus, in certain embodiments, the incident apparatus 104 may perform one or more cognitive computing processes 140 on the data captured by the various data sources/servers and sensors using the remote server 124 in order to generate one or more recommendations for drivers, passengers, and/or responders on the scene, or in route to the scene, of the traffic incident 102 to provide a more complete, accurate, and effective way to respond to the traffic incident 102. In such an embodiment, the environment data that the sensors capture at the traffic incident 102 is transmitted to the remote server 124 over one or more computer networks 128.

In one embodiment, the cognitive computing processes 140 include a concept insights service, which is accessible using an application programming interface ("API"), that searches documents or files, scrapes websites and/or other online data sources, queries databases, and/or the like for information that is relevant to a search input such as a keyword, an image, a sound, a video, and/or the like. The search input may be determined based on the data received from the various sensors and data sources depicted in FIG. 1 that are related to the traffic incident 102. For example, if a chemical is identified on site at the traffic incident 102, the concept insights service may scrape websites for relevant information related to that particular chemical.

Once the relevant information is received, a retrieve and rank service takes the relevant information that the concept insights service gathered and ranks the relevant information in order of relevancy to the situation at the traffic incident 102. For instance, it may be relevant to determine how to handle the particular chemical located on site at the traffic incident 102. Accordingly, the retrieve and rank service may search or interpret the relevant information for that chemical, using natural language processing or the like, to determine which information is most relevant for handling the chemical. The highest-ranked information may be used to generate the recommendations and/or alerts for the individuals present at the traffic incident 102.

The cognitive computing processes 140 may also include an alchemy vision service that analyzes images and/or videos for objects, people, text, and/or the like using image processing. Furthermore, a visual recognition service may be used to allow users to automatically identify subjects and objects contained within images, videos, and/or the like. The output from both the alchemy vision and the visual recognition services may be provided to other services to further process the information such as facial recognition or other image processing services, optical character recognition services, the concept insights service, and/or the like. For example, the alchemy vision service may include a service to quickly and accurately tag, classify and search visual content using machine learning, such as visual recognition incorporated by IBM Watson®. The visual recognition may be through an image taken by a satellite 126, airplane, etc.

In some embodiments, the cognitive computing processes 140 store data from previous processing of traffic incidents 102 in a data store 142, e.g., a data base that can be referenced for processing future traffic incidents 102. In other words, the cognitive computing processes 140 learn from past experiences to provide more accurate results for future traffic incidents 102. For example, the cognitive computing processes 140 may store information that was previously captured/determined for specific chemicals that may have been present at a previous traffic incident, such as weather conditions, temperatures, names of the chemicals, compositions of the chemicals, and/or the like. The cognitive computing processes 140 may then reference the data store 142 for a particular chemical that is present at a current traffic incident 102 to determine how the chemical was previously handled given other conditions such as the weather, or the like. The concept insights service, for example, may reference the previously captured data, and use it to generate recommendations for responding to a current traffic incident 102 if a similar condition or situation is present at the current traffic incident 102, in addition to the other data obtained from other external data sources.

In some embodiments, at least a portion of the cognitive computing processes 140 are performed locally on a device that is present at the scene of the traffic incident 102. In certain embodiments, for example, the incident apparatus 104 may not have access to the computer network 128, and thus the cognitive computing processes 140 located in the cloud may not be available to the incident apparatus 104. Accordingly, the incident apparatus 104 may perform at least a portion of the cognitive computing processes 140 on a device that is located at the traffic incident 102 to provide recommendations that are as accurate as possible based on the sensor data that is captured at the scene of the traffic incident 102.

The computer network 128, in one embodiment, includes a digital communication network that transmits digital communications. The computer network 128 may include a wireless network, such as a wireless cellular network, a local wireless network, such as a Wi-Fi network, a Bluetooth® network, a near-field communication ("NFC") network, an ad hoc network, and/or the like. The computer network 128 may include a wide area network ("WAN"), a storage area network ("SAN"), a local area network ("LAN"), an optical fiber network, the internet, or other digital communication network. The computer network 128 may include two or more networks. The computer network 128 may include one or more servers, routers, switches, and/or other networking equipment. The computer network 128 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2:
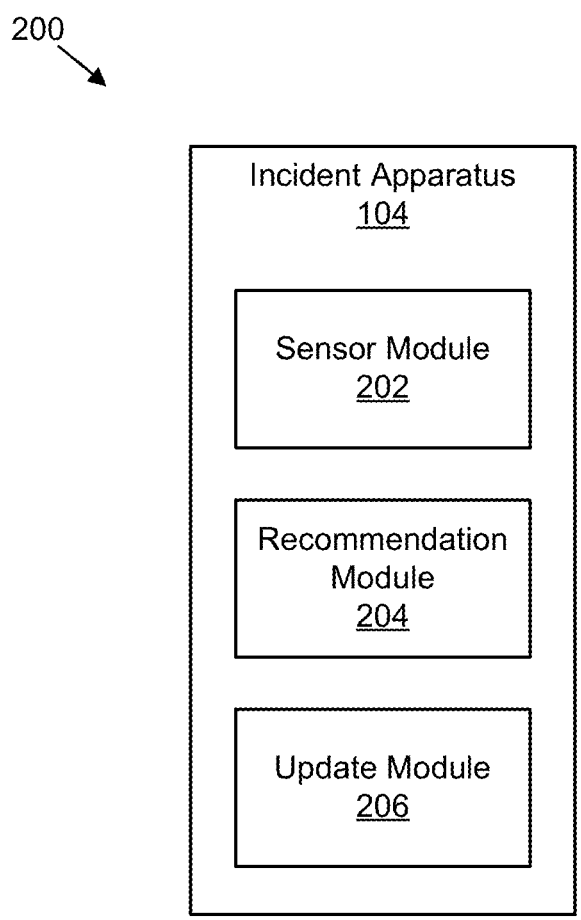
FIG. 2 is a schematic block diagram illustrating one embodiment of an apparatus for cognitive-based incident response.

FIG. 2 depicts one embodiment of an apparatus 200 for cognitive-based incident response. The apparatus 200 includes an instance of an incident apparatus 104. The incident apparatus 104 includes one or more of a sensor module 202, a recommendation module 204, and an update module 206, which are described in more detail below.

In one embodiment, the sensor module 202 is configured to capture baseline environment data related to a traffic incident 102 using one or more sensors present at the location of the traffic incident 102, within the vicinity of the traffic incident 102, proximate to the traffic incident 102, and/or the like. The baseline environment data may be an initial set of sensor data that the sensors capture when the incident apparatus 104 is first presented at the scene of the traffic incident 102. For example, a first responder 116 may bring a device that the incident apparatus 104 is located on to the traffic incident 102, and the sensor module 202 may begin sampling environment data from the traffic incident 102 using one or more sensors. For instance, the sensor module 202 may sample data using cameras, video cameras, RFID readers, vehicle sensors, temperature sensors, weather sensors, and/or the like.

In one embodiment, the sensor module 202 captures data in real-time while data regarding a traffic incident 102 is available. For example, sensor data may be in a buffer and may only be available for a short period of time and the sensor module 202 captures relevant data before the data is lost.

The recommendation module 204, in one embodiment, is configured to generate and make available, in real-time, one or more recommendations for responding to the traffic incident 102. In certain embodiments, the recommendation module 204 uses cognitive computing processes 140 to generate the one or more recommendations based on the baseline environment data. For instance, the recommendation module 204 may transmit the baseline environment data to the remote server 124 where it can be processed by the cognitive computing processes 140. The cognitive computing processes 140 may analyze the data to determine information that will be helpful to individuals responding to the scene of the traffic incident 102.

For example, the baseline environment data may include an image that a camera captured of a placard on a semi-truck 106 hauling flammable chemicals that includes text that indicates the types of chemicals that are in the semi-truck 106. The recommendation module 204 may send the image to the remote server 124 where the cognitive computing processes 140 perform various image processing and OCR algorithms on the image to determine the text information on the placard. The cognitive computing processes 140 may then use the text to scrape external data sources for information related to safely handling the chemicals. The recommendation module 204 may take the information from the cognitive computing processes 140 and generate one or more recommendations for handling the chemicals in the semi-truck 106. The recommendation module 204 may make the recommendations available in real-time to the responders 116 on the scene of the traffic incident 102 so that they have information about safely handling the chemicals while responding to the traffic incident 102 prior to actually handling the chemicals.

For example, a semi-truck 106 may be hauling drums of pool chlorine that were damaged during the traffic incident 102 causing granular chlorine to spill on the floor of the semi-trailer. Furthermore, the semi-trailer includes a barrel of sulfur dioxide that was also damaged during the traffic incident 102 and is spilling on the semi-trailer floor and is mixing with the chlorine. There may also be a small fire 110 at the traffic incident 102, which the fire department has been called to respond to. The sensor module 202 at the traffic incident 102 may capture information from the semi-truck, e.g., identifying information from images, and the cognitive computing processes 140 may use that information to identify and query the cargo manifest for the semi-truck 106.

The cognitive computing processes 140 may determine that it would be harmful to mix water with a combination of chlorine and sulfur dioxide, and the recommendation module 204 may send a recommendation and/or an alert to responders to let them know what the cargo is within the semi-trailer and that water should not be used around the semi-trailer or the result can be hydrogen chlorine gas and sulfuric acid, which would create a risk for responders 116. Other hazardous materials that may be identified at the traffic incident 102 may include explosives, gases, flammable liquids, flammable solids, oxidizing substances, toxic and infections substances, radioactive substances, corrosives, and/or the like.

In another example, the baseline environment data may include an image of the unique identifier for a semi-truck 106. The recommendation module 204 may send the image of the unique identifier of the semi-truck 106 to the remote server 124 over the computer network 128 where cognitive computing processes 140 are used to determine the text in the image that includes the semi-truck's 106 unique identifier using image processing algorithms, for instance. The cognitive computing processes 140 may use the unique identifier to lookup the truck's manifest (e.g., using the vehicle company server 112) to determine the name of the chemicals that the semi-truck 106 is transporting and then scrape externa data sources, e.g., websites, to determine the chemical handling procedures, the chemical environmental considerations, and/or the like. The cognitive computing processes 140 use this information, in addition to data from external sources such as weather information, to generate recommendations for safely managing the chemicals for the semi-truck 106 involved in the traffic incident 102. For example, the cognitive computing processes 140 may calculate the safe distance to the traffic incident 102 using wind speed obtained from the weather server 122 and the chemical environmental considerations information previously obtained.

Thus, in one embodiment, the recommendation module 204 generates recommendations that include precautionary information for managing one or more emergency situations at the traffic incident 102. The recommendation module 204, in various embodiments, provides the recommendations to the responders 116 in real-time while the responders 116 are on the scene, while the responders 116 are in route to the scene, before responders 116 located in base dispatch depart to the scene, and/or the like.

In certain embodiments, the recommendation module 204 makes the recommendations available over a computer network 128 such as a local Wi-Fi network, a cellular network, an ad-hoc network, a peer-to-peer network, and/or the like. For example, the recommendation module 204 may detect devices that are available within the vicinity of the recommendation module 204, e.g., within a proximity of a device that the recommendation module 204 is executing on, and determine whether the devices have been flagged or are otherwise recognized as devices that have been approved to receive recommendations from the recommendation module 204. If so, then the recommendation module 204 may transmit the recommendations to the devices over an ad-hoc network that consists of the various approved devices, over a cellular network, and/or the like.

In certain embodiments, the recommendation module 204 broadcasts and/or otherwise transmits the recommendations over a Bluetooth® connection, an NFC connection, an IR connection, an RF connection, and/or the like. In certain embodiments, the recommendation module 204 sends the recommendations to a dispatch system for a dispatcher associated with the responders 116, and the dispatch system and/or the dispatcher sends the recommendations out to the responders 116 as they become available.

In some embodiments, the sensor module 202 captures images of equipment that is present at the traffic incident 102, such as medical devices, fire suppression equipment, chemical handling equipment, law enforcement equipment, and/or the like. Similarly, the sensor module 202, may use sensors to detect wireless signals emitted from different equipment devices present at the traffic incident 102. Based on input from the various other different external data sources and the information from the location of the traffic incident 102, the cognitive computing processes 140 may determine which equipment is necessary and/or useful for responding to the traffic incident 102, which equipment is present at the traffic incident 102, and which equipment is needed to manage situations at the traffic incident. The recommendation module 204 may generate recommendations for responders that includes recommendations for equipment that may be needed at the traffic incident 102.

In one embodiment, the update module 206 is configured to continuously capture or sample new environment data for the traffic incident 102 using one or more sensors. For example, the device that the incident apparatus 104 is located on may be carried through the traffic incident 102 as the traffic incident 102 is processed by responders 116. In such as embodiment, the update module 206 and/or the sensor module 202 may continuously capture environment data for the traffic incident 102.

The update module 206 may supplement, aggregate, and/or enhance the baseline environment data and/or previously collected environment data with the new environment data. For example, the update module 206 may combine the baseline and new environment data sets, may overwrite one or more baseline environment data sets with new environment data sets, may append the new environment data sets to the baseline environment data sets, and/or the like. In some embodiments, the update module 206 transmits the supplemented environment data, and, in certain embodiments, the previously generated recommendations, to the remote server 124 so that the cognitive computing processes 140 can analyze the supplemented environment data using one or more external data sources, to generate one or more updated recommendations for the traffic incident 102.

Thus, the update module 206 continuously scans the scene of the traffic incident 102 and provides information that the sensors capture to the cognitive computing processes 140 so that real-time notifications, recommendations, alerts, and/or the like can be provided to responders at the traffic incident 102. Consequently, if conditions at the traffic incident 102 change, or are about to change, the update module 206 can notify responders 116 of the changed conditions and provide them with recommendations for reacting to the changed conditions, as determined by the cognitive computing processes 140 using the environment data and data from the external data sources.

Figure 3:
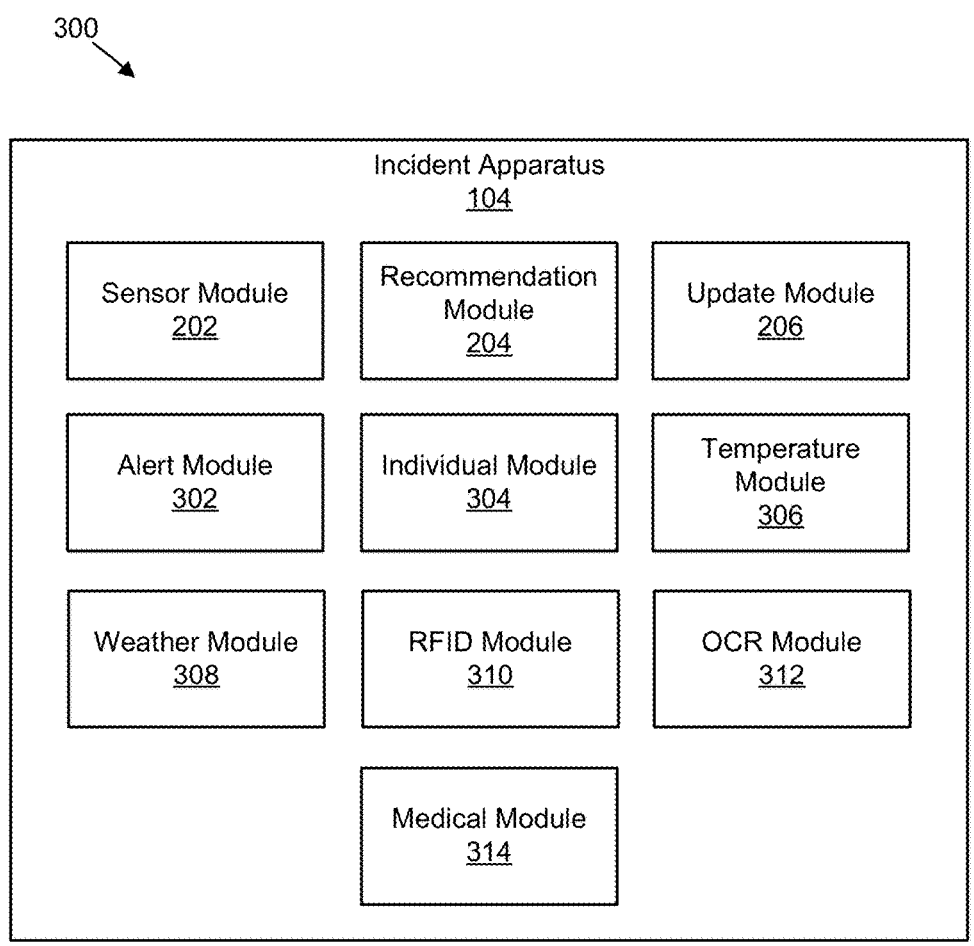
FIG. 3 is a schematic block diagram illustrating one embodiment of another apparatus for cognitive-based incident response.

FIG. 3 depicts one embodiment of another apparatus 300 for cognitive-based incident response. The apparatus 300 includes an instance of an incident apparatus 104. The incident apparatus 104 includes one or more of a sensor module 202, a recommendation module 204, and an update module 206, which may be substantially similar to the sensor module 202, the recommendation module 204, and the update module 206 described above with reference to FIG. 2. The incident apparatus 104, in various embodiments, may include an alert module 302, an individual module 304, a temperature module 306, a weather module 308, an RFID module 310, an OCR module 312, and/or a medical module 314, which are described in more detail below.

The alert module 302, in one embodiment, is configured to immediately generate and send an alert to responders 116 at the traffic incident 102 in response to the cognitive computing processes 140 determining that a high-risk situation is present at the traffic incident 102 and/or is about to occur at the traffic incident 102 based on the environment data. For example, a temperature sensor may detect the temperature of a vehicle's 103 engine. The sensor module 202, recommendation module 204, and/or the update module 206 may send the temperature information to the remote server 124 to be analyzed by the cognitive computing processes 140. The cognitive computing processes 140 may determine that the temperature of the engine is reaching a dangerous temperature where it may combust and explode. Accordingly, the cognitive computing processes 140 may trigger the alert module 302 to immediately send an alert stating that the temperature of the vehicle's 103 engine is reaching an unsafe level and to get a safe distance from the vehicle 103.

The alert module 302 may broadcast an alert to any devices within a proximity of the alert module 302, of the vehicle 103, of the traffic incident 102, and/or the like over a computer network 128 such as a cellular network, an ad-hoc network, a mesh network, a peer-to-peer network, a push notification, a Bluetooth® connection, and NFC connection, and/or the like.

In one embodiment, the individual module 304 is configured to determine, on an ongoing basis during the traffic incident 102, image data from the environment data captured by the one or more sensors, e.g., such as a digital camera, a video camera, and/or the like. The individual module 304 may provide the image data to the cognitive computing processes 140, which may perform various image processing methods, facial recognition techniques, and/or the like to identify one or more persons present at the traffic incident 102 and to determine background information for the one or more identified persons. For instance, the cognitive computing may search government or other databases, e.g., the DMV server 120, to identify persons in the image data, e.g., to obtain a person's name, address, and/or the like, and based on the identifying information, the cognitive computing processes 140 may perform background checks on individuals involved in the traffic incident 102. For example, the cognitive computing processes 140 may perform criminal background checks to determine whether the individual has any outstanding warrants, has been previously convicted of dangerous crimes, and/or any other background information that may be useful for the responders 116 and/or affect the safety of the responders 116.

In another example, the cognitive computing processes 140 may use identifying information for persons present at the traffic incident 102 to access medical record data and information for persons involved in the traffic incident 102. For instance, the cognitive computing processes 140 may access medical databases, e.g., the emergency responder server 114, and query for information based on the individuals' identities. Responders 116 may use the medical record data to determine how best to respond and/or treat individuals involved in the traffic incident 102, even before the responders 116 approach the individuals based on the image data of the individuals captured by the sensors around the individuals. For example, the cognitive computing processes 140 may query a medical database for the user's name and date of birth and parse medical records to determine that the user has a history of physical violence, emotional instability, and/or the like.

Accordingly, the individual module 304 updates the recommendations for the responders 116 in real-time in response to determining that an individual poses a threat to a responder 116, based on the background check information, and/or in response to determining that an individual has a documented medical condition.

In one embodiment, the temperature module 306 is configured to determine, on an ongoing basis during the traffic incident 102, thermal imaging data from the environment data captured by the one or more sensors, such as a thermal camera capable of forming images using infrared radiation that depict temperature variations at different areas within the image. The temperature module 306 may provide the thermal imaging data to the cognitive computing processes 140, which may perform various image processing methods, temperature analyses, and/or the like to identify one or more areas of interest at the traffic incident 102 based on the temperatures of the areas.

For instance, the cognitive computing processes 140 may use the thermal imaging data to identify areas of the traffic incident 102 where temperatures are high enough to indicate a fire, a chemical reaction, and/or the like; where temperatures are abnormal given the weather conditions, or are abnormally changing (e.g., abnormally raising or lowering), and/or the like. For example, if it is 45 degrees outside, as determined by data obtained from the weather server 122, but the thermal imaging data indicates that the temperature inside a semi-trailer is five degrees higher, and is going up a degree every 30 seconds, then the cognitive computing processes 140 may determine that the temperature inside the semi-trailer is abnormal and is trending in a way that indicates a fire within the semi-trailer. Accordingly, the temperature module 306 updates the recommendations, in real-time, based on the areas of the traffic incident 102 that are identified as areas of concern based on the temperature data.

The weather module 308, in one embodiment, is configured to determine, on an ongoing basis during the traffic incident 102, weather information from the environment data captured by the one or more sensors. For example, the one or more sensors may include a weather station that detects wind, air pressure, humidity, precipitation, temperature, and/or the like. The weather module 308 may send the weather data that is captured at the traffic incident 102 to the cognitive computing processes 140 where it may be used to supplement, to compare to, and/or the like the weather data that is received from the weather server 122.

In particular, in one embodiment, the cognitive computing processes 140 may use the weather data received from the weather module 308 and/or received form the weather server 122 to determine one or more weather conditions that may change. For instance, the cognitive computing processes 140 may determine that the weather data from the weather server 122 indicates that the weather conditions at the traffic incident 102 are about to change and may complicate the situation at the traffic incident 102. For example, the cognitive computing processes 140 may determine that it is about to rain at the traffic incident 102 within the next ten minutes, which may cause an unsafe chemical reaction with one or more chemicals that may be present at the traffic incident 102. Accordingly, the cognitive computing processes 140 may trigger the alert module 302 to issue an alert to responders 116 at the traffic incident 102 to make them aware of the oncoming unsafe situation.

In another example, the cognitive computing processes 140 may determine, based on the wind speed at the traffic incident 102, that the safe distance to the traffic incident 102 has increased in response to the wind speed reducing at the traffic incident 102 and also based on determining that the forecast indicates that the wind speed will continue to decrease. Accordingly, the weather module 308 and/or the recommendation module 204 may generate and send a recommendation or notification to responders 116 to notify them that the safe distance to the traffic incident 102 has increased (e.g., so that the responders 116 can get closer to the traffic incident 102).

In one embodiment, the RFID module 310 is configured to determine, on an ongoing basis during the traffic incident 102, RFID information from the environment data captured by the one or more sensors, which, in such an embodiment, includes an RFID reader. For instance, the RFID reader may detect and read RFID tags that are on or within a semi-trailer, and which may provide information regarding the identity of items within the semi-trailer, and other information associated with the items within the semi-trailer, information for the shipping company, information for the driver, and/or the like.

In some embodiments, the RFID module 310 provides the RFID information an RFID server 130 and/or directly to the remote server 124 where it can be processed using the cognitive computing processes 140 to determine, for example, the exact contents of items being shipped by referencing electronic manifests and/or payload data from the semi-truck and/or the shipping company using the information provided by the RFID reader. For instance, the cognitive computing processes 140 may access the vehicle company server 112 to query information using the identifying information read from the RFID tags at the location of the traffic incident 102. Based on the determined information, the RFID module 310 may update the recommendations for the responders 116, and provide the updated recommendations to the responders 116 in real-time.

In one embodiment, the OCR module 312 is configured to determine, on an ongoing basis during the traffic incident 102, one or more images of the environment data captured by the one or more sensors that includes textual information. For instance, the images may be captured with a camera, a video camera, and/or the like. The captured images may contain textual information that may provide identifying information for a shipping company, for items contained in a semi-trailer, for chemicals or other materials present at the traffic incident 102, for street signs or other location information at the traffic incident 102, for license plate information, for vehicle information (e.g., the make and model, the vehicle identification number ("VIN"), license plate data, registration information, and/or the like), for driver's license information, for bill-of-lading information, and/or the like.

Other sources of captured images may be cameras 136 at traffic signals 138, back-up cameras, dashboard cameras, body cameras 118 worn by responders 116, television cameras that may be present at the traffic incident 102, satellite images, and/or the like. The OCR module 312 may provide the captured images to the remote server 124 to process the images to detect, understand, interpret, and/or the like the text within the images. The cognitive computing processes 140, for example, may perform image processing algorithms (e.g., edge detection) on the images to determine if there is text within the images, and if so, what the text means.

The cognitive computing processes 140 may convert the image text to machine readable text (e.g., ASCII text, Unicode, etc.) that can be used to query data sources such as the vehicle company server 112, the DMV server 120, the traffic control server 134, and/or the like for data that is associated with the textual information, and which may be useful for responders 116 when responding to the traffic incident 102. For example, the cognitive computing processes 140 may use textual information for the shipping company, e.g., company name and truck identification information, to query the vehicle company server 112 for the electronic shipping manifest that details the contents carried on the semi-trailer. Based on the information that the cognitive computing processes 140 obtain, the OCR module 312 may update the recommendations for the responders 116, and provide the updated recommendations to the responders 116 in real-time.

In one embodiment, the medical module 314 is configured to determine, on an ongoing basis during the traffic incident 102, medical transponder information from the environment data captured by the one or more sensors, which may include a medical transponder frequency scanner, a wireless signal scanner, and/or the like. As used herein, a medical transponder may refer to a device that emits a wireless signal at a particular frequency. The wireless signal may contain medical information for a person associated with the medical transponder. The wireless signal may be received and interpreted to determine any medical conditions, medications, and/or the like that a particular person is associated with.

For instance, the medical module 314 may continuously scan various wireless frequencies for wireless signals emitted from various medical transponders. The wireless signals comprising the medical transponder information may be transmitted to the remote server 124 for the cognitive computing processes 140 to use to determine the medical information encoded in the wireless signal. For example, the cognitive computing processes 140 may decode the wireless signal to determine that an individual has asthma and uses an inhaler to treat their asthma condition. The cognitive computing processes 140 may further determine other conditions at the traffic incident 102 that may negatively impact or exacerbate the individual's medical condition. For example, if it is determined that a user has asthma, the cognitive computing processes 140 may process other data to determine if there is smoke at the traffic incident 102, if there are chemicals present at the traffic incident 102 that may affect the user's asthma condition, and/or the like. Accordingly, based on the information that the cognitive computing processes 140 determine, the medical module 314 may update the recommendations for the responders 116, and provide the updated recommendations to the responders 116 in real-time.

Figure 4:
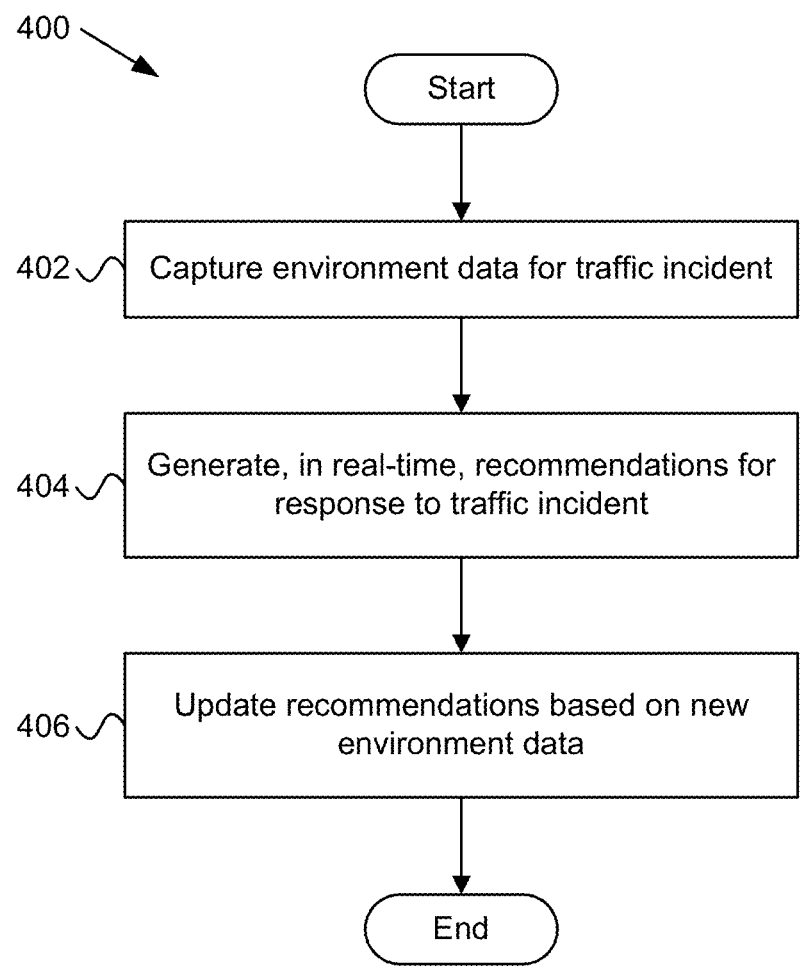
FIG. 4 is a schematic flow chart diagram illustrating one embodiment of a method for cognitive-based incident response.

FIG. 4 depicts one embodiment of a method 400 for cognitive-based incident response. In one embodiment, the method 400 begins and captures 402 baseline environment data related to a traffic incident 102 using one or more sensors at a location of the traffic incident 102. In a further embodiment, the method 400 generates and makes available, in real-time, one or more recommendations for responding to the traffic incident 102 using cognitive computing processes 140 based on the baseline environment data. The one or more recommendations may include precautionary information for managing one or more emergency situations at the traffic incident 102. The method 400 updates 406 and makes available the one or more recommendations, using the cognitive computing processes 140, based on new environment data that is captured during the traffic incident 102 and is used to supplement the baseline environment data, and the method 400 ends. In certain embodiments, the sensor module 202, the recommendation module 204, and the update module 206 perform the various steps of the method 400.

Figure 5A:
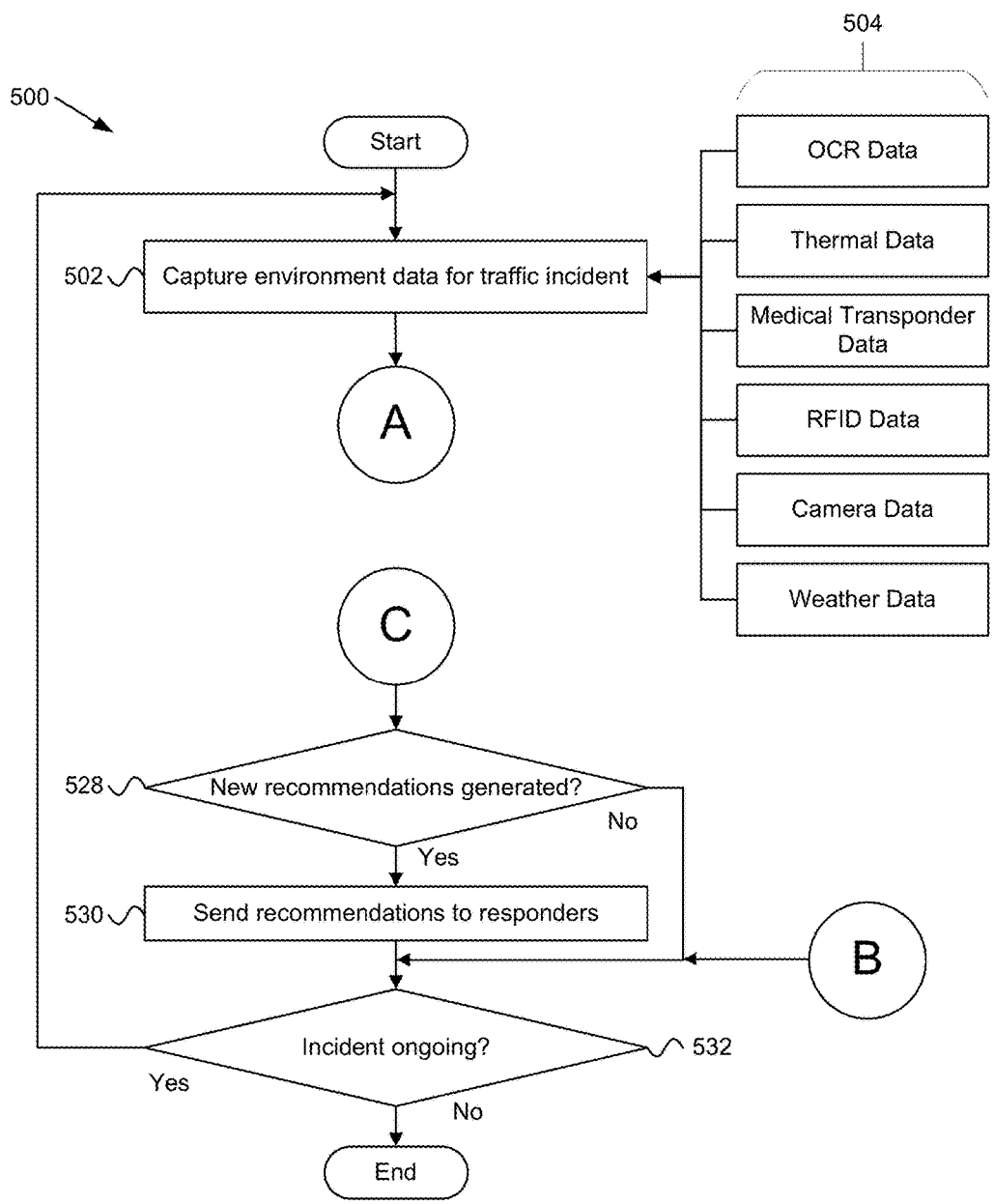
FIG. 5A is a schematic flow chart diagram illustrating one embodiment of a portion of a method for cognitive-based incident response.
Figure 5B:
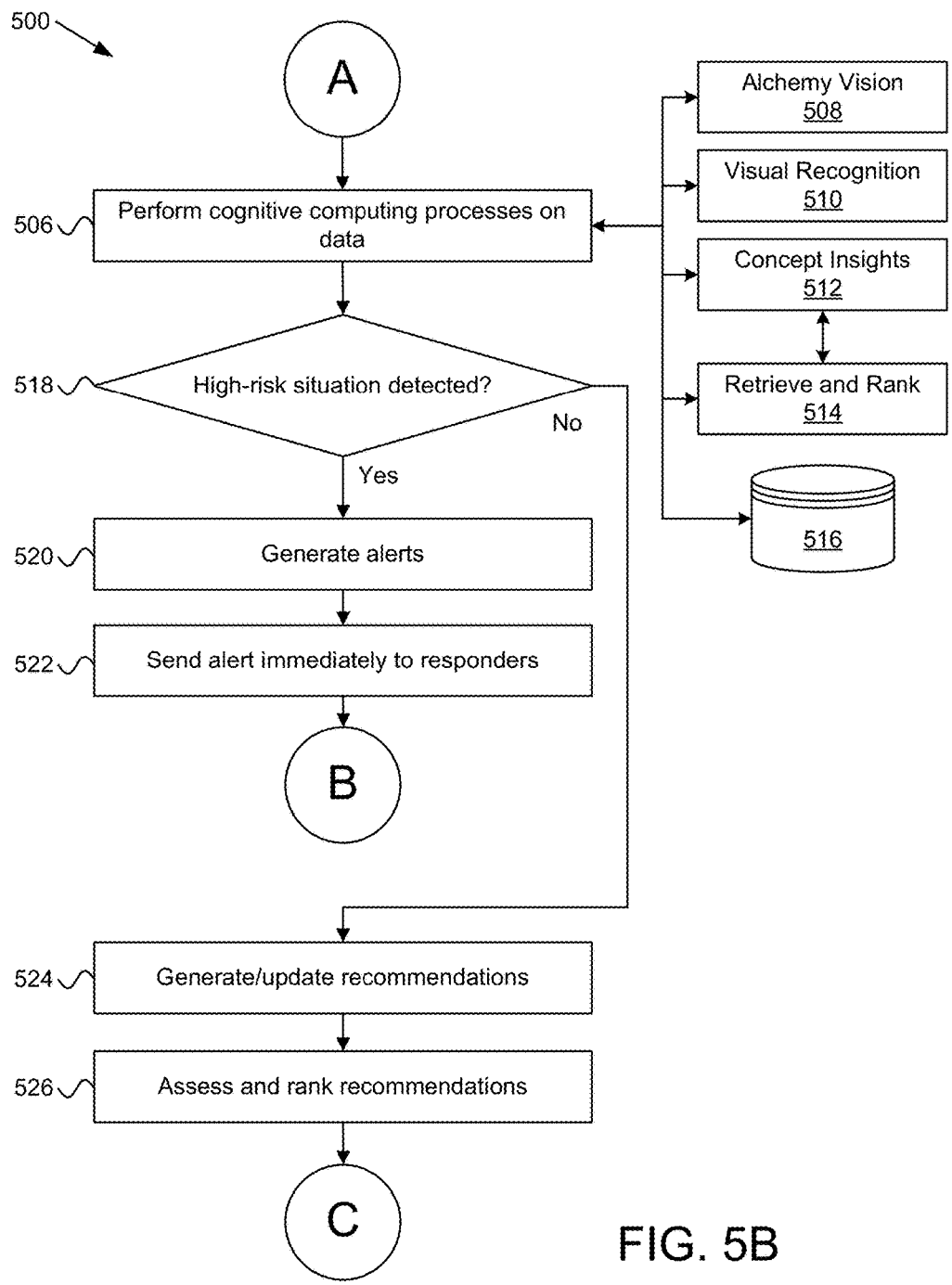
FIG. 5B is a schematic flow chart diagram illustrating one embodiment of a portion of the method of FIG. 5A for cognitive-based incident response.

FIGS. 5A and 5B depict one embodiment of a method 500 for cognitive-based incident response. In one embodiment, the method 500 begins and captures 502 environment data for a traffic incident 102 using one or more sensors 504 located at the scene of the traffic incident 102 and/or otherwise associated with the traffic incident 102. The one or more sensors 504 may collect OCR data, thermal data, medical transponder data, RFID data, camera data, weather data, and/or the like.

In further embodiments, referring to FIG. 5B, the method 500 performs 506 various cognitive computing processes 140 on the environment data, such as an alchemy vision process 508, a visual recognition process 510, a concept insights process 512, a retrieve and rank process 514 (that ranks information that the concept insights process obtains), as described above. Furthermore, the cognitive computing processes 140 may obtain data from various external data sources 516, as depicted and described above with reference to FIG. 1.

For example, the cognitive computing processes 140 may perform an API call to the visual recognition process 510 while providing the visual recognition process 510 with one or more images captured at the traffic incident 102. The visual recognition process 510 returns information indicating objects, events, settings, and/or the like that are in the images. For instance, the visual recognition process 510 may detect and interpret text information in an image of a hazard warning plate on a semi-trailer. The concept insights process 512 may use the hazard warning plate information, which may include a United Nations Identifier that identifies the substances being carried in the semi-trailer, which may be accessible from a data store maintained by the UN Committee of Experts on the Transport of Dangerous Goods, and an emergency action code that indicates actions to be taken by responders 116, such as fire brigade responders, HAZMAT responders, or the like, for handling and managing the identified substances at the traffic incident 102. The indicated actions may be provided as recommendations to the responders 116 while they are on the scene.

The method 500 determines 518 whether the results of the cognitive computing processes 140 indicates that a high-risk situation is present at the traffic incident 102. For instance, the cognitive computing processes 140 may determine that there is a risk of a chemical explosion based on the types of chemicals present at the traffic incident 102, the temperatures and/or weather conditions at the traffic incident 102, and/or the like.

In such an embodiment, the method 500 generates 520 one or more alerts, alarms, or other warning signals and immediately sends 522 the alerts to the responders 116 to notify them of the high-risk situation at the traffic incident 102. In one embodiment, the method 500 returns to FIG. 5A and the method 500 determines 532 whether the traffic incident 102 is still ongoing. If so, the method 500 returns and continues to capture 502 environment data. Otherwise, the method 500 ends.

Referring again to FIG. 5B, in one embodiment, if the method 500 determines 518 that there is not a high-risk situation detected at the traffic incident 102, the method 500 generates and/or updates 524 one or more recommendations for responding to the traffic incident 102. In further embodiments, the method 500 assesses 526 each recommendation to determine the relevance of the recommendation, the risk associated with the recommendation, and/or the like, and ranks the recommendations based on the assessment.

Referring to FIG. 5A, in one embodiment, the method 500 determines 528 whether new recommendations were generated. If so, then the method 500, in certain embodiments, sends 530 the recommendations to the responders 116 at the scene of the traffic incident 102. The method 500, in some embodiments, determines 532 whether the traffic incident 102 is still ongoing, and if so, continues to capture 502 environment data for the traffic incident 102. Otherwise, the method 500 ends. In one embodiment, the sensor module 202, the recommendation module 204, the update module 206, the alert module 302, the individual module 304, the temperature module 306, the weather module 308, the RFID module 310, the OCR module 312, and the medical module 314 perform the various steps of the method 500.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a sensor module that captures baseline environment data related to a traffic incident using one or more sensors at a location of the traffic incident, the baseline environment data transmitted to one or more cognitive computing processes over a computer network;
a recommendation module that:
  generates, in real-time, one or more recommendations for responding to the traffic incident using cognitive computing processes based on the baseline environment data, the cognitive computing processes scraping one or more online data sources for information related to the traffic incident for generating the one or more recommendations, the scraped information ranked by relevance to the traffic incident such that highest-ranked information is used to generate the one or more recommendations, the one or more recommendations comprising precautionary information for managing one or more emergency situations at the traffic incident; and
  provides the one or more recommendations to first responders that are in transit to the traffic incident;
an update module that:
  continuously captures new environment data for the traffic incident using the one or more sensors;
  supplements the baseline environment data with the new environment data; and
  generates and makes available, in real-time, one or more updated recommendations to first responders at the traffic incident based on the supplemented environment data, the supplemented environment data and the one or more recommendations provided to the cognitive computing processes to scrape the one or more online data sources for information related to the traffic incident and generate the one or more updated recommendations;
a weather module that:
  determines, on an ongoing basis during the traffic incident, weather information from the environment data captured by the one or more sensors, the one or more sensors comprising a weather station;
  provides the weather information to the cognitive computing processes to determine one or more conditions at the traffic incident that may change responsive to the weather information, the cognitive computing processes accessing weather data from one or more external weather sources; and
  updates the one or more recommendations, in real-time, based on the one or more conditions that may change; and
an RFID module that:
  determines, on an ongoing basis during the traffic incident, radio-frequency identification ("RFID") information from the environment data captured by the one or more sensors, the one or more sensors comprising an RFID tag reader;
  provides the RFID information to the cognitive computing processes to determine contents of one or more containers at the traffic incident, the cognitive computing processes referencing one or more of electronic manifests and payload data using the RFID information to determine the contents of the one or more containers; and
  updates the one or more recommendations, in real-time, based on the determined container contents.

2. The apparatus of claim 1, wherein the cognitive computing processes are located on a remote server accessible to one or more computer networks comprising information related to the traffic incident, the environment data transmitted from the traffic incident to the remote server over the one or more computer networks.

3. The apparatus of claim 1, further comprising an alert module that immediately generates and sends an alert to responders at the traffic incident in response to the cognitive computing processes determining a high-risk situation at the traffic incident based on the environment data.

4. The apparatus of claim 1, wherein the cognitive computing processes further access and analyze traffic incident data from previous traffic incidents for traffic incident data that is similar to one or more conditions of the traffic incident to generate the one or more recommendations for responding to the traffic incident.

5. The apparatus of claim 1, further comprising an individual module that:
  determines, on an ongoing basis during the traffic incident, image data from the environment data captured by the one or more sensors, the one or more sensors comprising a camera;
  provides the image data to the cognitive computing processes to identify one or more persons present at the traffic incident and to determine background information for the one or more identified persons, the cognitive computing processes accessing background check and medical record data to determine the background information for each of the one or more persons; and
  updates the one or more recommendations, in real-time, in response to the background information indicating that one or more individuals at the traffic incident one or more of poses a threat and has a documented medical condition.

6. The apparatus of claim 1, further comprising a temperature module that:
  determines, on an ongoing basis during the traffic incident, thermal imaging data from the environment data captured by the one or more sensors, the one or more sensors comprising a thermal camera;
  provides the thermal imaging data to the cognitive computing processes to identify one or more areas of the traffic incident where the temperature indicates one or more of an area that is a fire risk and an area where the temperature is abnormal; and
  updates the one or more recommendations, in real-time, based on the identified areas.

7. The apparatus of claim 1, further comprising an OCR module that:
  determines, on an ongoing basis during the traffic incident, one or more images of the environment data captured by the one or more sensors that comprises textual information, the one or more sensors comprising a camera;
  provides the one or more images comprising textual information to the cognitive computing processes to recognize and determine identifying information for one or more of parties involved in the traffic incident, companies associated with parties involved in the traffic incident, and shipping containers involved in the traffic incident; and
  updates the one or more recommendations, in real-time, based on the identifying information.

8. The apparatus of claim 1, further comprising a medical module that:
   determines, on an ongoing basis during the traffic incident, medical transponder information from the environment data captured by the one or more sensors, the one or more sensors comprising a medical transponder frequency scanner;
   provides the medical transponder information to the cognitive computing processes to determine whether conditions at the traffic incident may be detrimental to persons that have medical conditions associated with the medical transponders; and
   updates the one or more recommendations, in real-time, based on the medical transponder information.

9. The apparatus of claim 1, wherein the one or more recommendations further comprises recommendations for equipment that may be needed to manage one or more situations at the traffic incident, the equipment comprising one or more of medical equipment, fire extinguishing equipment, and chemical handling equipment.

10. The apparatus of claim 1, wherein the one or more sensors are associated with one or more of a vehicle involved in the traffic incident, a vehicle proximate to the traffic incident, a traffic signal control system, a responder's device, and a driver's device.

11. A system comprising:
   one or more local devices at a traffic incident;
   one or more sensors communicatively coupled to the one or more local devices;
   a remote server communicatively coupled to the one or more local devices over one or more computer networks, the remote server executing one or more cognitive computing processes;
   a sensor module that captures baseline environment data related to a traffic incident using one or more sensors at a location of the traffic incident, the baseline environment data transmitted to one or more cognitive computing processes over a computer network;
   a recommendation module that:
      generates, in real-time, one or more recommendations for responding to the traffic incident using cognitive computing processes based on the baseline environment data, the cognitive computing processes scraping one or more online data sources for information related to the traffic incident for generating the one or more recommendations, the scraped information ranked by relevance to the traffic incident such that highest-ranked information is used to generate the one or more recommendations, the one or more recommendations comprising precautionary information for managing one or more emergency situations at the traffic incident; and
      provides the one or more recommendations to first responders that are in transit to the traffic incident;
   an update module that:
      continuously captures new environment data for the traffic incident using the one or more sensors;
      supplements the baseline environment data with the new environment data; and
      generates and makes available, in real-time, one or more updated recommendations to first responders at the traffic incident based on the supplemented environment data, the supplemented environment data and the one or more recommendations provided to the cognitive computing processes to scrape the one or more online data sources for information related to the traffic incident and generate the one or more updated recommendations;
   a weather module that:
      determines, on an ongoing basis during the traffic incident, weather information from the environment data captured by the one or more sensors, the one or more sensors comprising a weather station;
      provides the weather information to the cognitive computing processes to determine one or more conditions at the traffic incident that may change responsive to the weather information, the cognitive computing processes accessing weather data from one or more external weather sources; and
      updates the one or more recommendations, in real-time, based on the one or more conditions that may change; and
   an RFID module that:
      determines, on an ongoing basis during the traffic incident, radio-frequency identification ("RFID") information from the environment data captured by the one or more sensors, the one or more sensors comprising an RFID tag reader;
      provides the RFID information to the cognitive computing processes to determine contents of one or more containers at the traffic incident, the cognitive computing processes referencing one or more of electronic manifests and payload data using the RFID information to determine the contents of the one or more containers; and
      updates the one or more recommendations, in real-time, based on the determined container contents.

12. The system of claim 11, wherein the captured environment data is transmitted from the one or more local devices to the remote server over the one or more computer networks to be processed using the cognitive computing processes.

13. The system of claim 11, further comprising an alert module that immediately generates and sends an alert to responders at the traffic incident in response to the cognitive computing processes determining a high-risk situation at the traffic incident based on the environment data.

14. The system of claim 11, wherein the one or more sensors are associated with one or more of a vehicle involved in the traffic incident, a vehicle proximate to the traffic incident, a traffic signal control system, a responder's device, and a driver's device.

15. A method comprising:
   capturing baseline environment data related to a traffic incident using one or more sensors at a location of the traffic incident, the baseline environment data transmitted to one or more cognitive computing processes over a computer network;
   generating, in real-time, one or more recommendations for responding to the traffic incident using cognitive computing processes based on the baseline environment data, the cognitive computing processes scraping one or more online data sources for information related to the traffic incident for generating the one or more recommendations, the scraped information ranked by relevance to the traffic incident such that highest-ranked information is used to generate the one or more recommendations, the one or more recommendations comprising precautionary information for managing one or more emergency situations at the traffic incident;
   providing the one or more recommendations to first responders that are in transit to the traffic incident;

continuously capturing new environment data for the traffic incident using the one or more sensors;

supplementing the baseline environment data with the new environment data;

generating and making available, in real-time, one or more updated recommendations to first responders at the traffic incident based on the supplemented environment data, the supplemented environment data and the one or more recommendations provided to the cognitive computing processes to scrape the one or more online data sources for information related to the traffic incident and generate the one or more updated recommendations;

determining, on an ongoing basis during the traffic incident, weather information from the environment data captured by the one or more sensors, the one or more sensors comprising a weather station;

providing the weather information to the cognitive computing processes to determine one or more conditions at the traffic incident that may change responsive to the weather information, the cognitive computing processes accessing weather data from one or more external weather sources;

updating the one or more recommendations, in real-time, based on the one or more conditions that may change;

determining, on an ongoing basis during the traffic incident, radio-frequency identification ("RFID") information from the environment data captured by the one or more sensors, the one or more sensors comprising an RFID tag reader;

providing the RFID information to the cognitive computing processes to determine contents of one or more containers at the traffic incident, the cognitive computing processes referencing one or more of electronic manifests and payload data using the RFID information to determine the contents of the one or more containers; and updating the one or more recommendations, in real-time, based on the determined container contents.

16. The method of claim 14, wherein the cognitive computing processes are located on a remote server accessible to one or more computer networks comprising information related to the traffic incident, the environment data transmitted from the traffic incident to the remote server over the one or more computer networks.

17. The apparatus of claim 1, wherein the recommendation module is further configured to send an image of a placard on a semi-truck hauling chemicals that is involved in the traffic incident to a remote server to be analyzed using one or more cognitive computing processes, the image captured by the one or more sensors at the location of the traffic incident, the image being processed for text information that can be used to scrape the online data sources for handling information related to safely handling the chemicals in the semi-truck, the handling information provided as a recommendation for the first responders.

18. The system of claim 11, wherein the recommendation module is further configured to send an image of a placard on a semi-truck hauling chemicals that is involved in the traffic incident to a remote server to be analyzed using one or more cognitive computing processes, the image captured by the one or more sensors at the location of the traffic incident, the image being processed for text information that can be used to scrape the online data sources for handling information related to safely handling the chemicals in the semi-truck, the handling information provided as a recommendation for the first responders.

* * * * *